United States Patent [19]
Jacob et al.

[11] 3,738,718
[45] June 12, 1973

[54] COMPACT ROLLER BEARING

[75] Inventors: Werner Jacob, Frankfurt; Arpad Toth, Herzogenaurach, both of Germany

[73] Assignee: Industriewerk Schaeffler OHG, Herzogenaurach, Germany

[22] Filed: Oct. 18, 1971

[21] Appl. No.: 189,940

[30] Foreign Application Priority Data
Nov. 4, 1970 Germany.................. P 20 54 112.2

[52] U.S. Cl. .............................................. 308/174
[51] Int. Cl. ........................................... F16c 19/22
[58] Field of Search............................ 308/213, 174

[56] References Cited
UNITED STATES PATENTS
2,567,242  9/1951  Smith................................. 308/213
2,337,511  12/1943  Wahlmark .......................... 308/174

Primary Examiner—Charles J. Myhre
Assistant Examiner—Frank Susko
Attorney—Nelson Littell, Nelson Littell, Jr., Charles A. Muserlian et al.

[57] ABSTRACT

A compact roller bearing assembly for the reception of radial and axial loads comprises a radial roller bearing in combination with an axial roller bearing; the radial roller bearing comprising a series of radial roller bodies between a thin-walled drawn outer ring and a massive inner ring; said massive inner ring having on one side thereof a first flange extending radially outwardly to the radially outer area of the radial roller bearing; said first flange of the massive inner ring having a face acting as a raceway for the axial roller bearing; said axial roller bearing having an outer diameter only slightly smaller than the outer diameter of the thin-walled outer ring of the radial roller bearing.

6 Claims, 3 Drawing Figures

COMPACT ROLLER BEARING

BACKGROUND OF THE INVENTION

The invention relates to a compact roller bearing assembly for the reception of radial and axial loads, comprising a radial roller bearing subassembly and an axial roller bearing subassembly.

In the prior art a known bearing of this kind is disclosed in Gebrauchsmusters Germany Pat. No. 1,940,353 which displays a massive raceway with an L-shaped cross section. The inner side of the radial shank of the raceway is formed as a race for the axial roller bodies, while the radial outer peripheral area of the axially extending shank represents the inner race of a radial needle bearing subassembly with a thin-walled shell as outer raceway. A disk with a rectangular cross section is placed on this shell and the radial face thereof forms the second race for the axial roller bodies. The radial inner faces of the roller bodies of the axial roller bearing subassembly run on the exterior surface of the thin-walled shell of the radial needle bearing subassembly.

This known roller bearing assembly does not exhibit the optimum possible load capacity in radial and axial direction, in relation to its outer dimensions. Only a part of the total radial height of the known whole bearing is available as a race for the axial roller bodies, while the radial needle bearing subassembly does not have the greatest possible number of roller bodies that could be accommodated in the allocated design space.

OBJECTS OF THE INVENTION

It is an object of the present invention to overcome this problem to avoid these disadvantages and to create a compact roller bearing assembly with a radial roller bearing subassembly and an axial roller bearing subassembly, in which an optimum loading capacity in the axial and the radial directions is attained in a given amount of available space.

It is a further object of the present invention to provide a radial roller bearing which comprises a thin-walled drawn outer ring and which further comprises a massive inner ring which has a flange on one side thereof, with this flange extending to the radial outer area of the radial roller bearing; a race for the axial roller bearing being formed by the face of the flange at the enlarged end of the radial flange of the massive inner ring; and the outer diameter of the axial roller bearing being only slightly smaller than the outer diameter of the thin-walled outer ring of the radial roller bearing.

Other and further objects of the present invention will become apparent from the description and from the drawings in which.

DESCRIPTION OF THE INVENTION

The present invention is directed to a compact roller bearing assembly for the reception of radial and axial loads comprising a radial roller bearing in combination with an axial roller bearing; the radial roller bearing comprising a series of radial roller bodies between a thin-walled drawn outer ring and a massive inner ring; said massive inner ring having on one side thereof a first flange extending radially outwardly to the radially outer area of the radial roller bearing; said first flange of the massive inner ring having a face acting as a raceway for the axial roller bearing; said axial roller bearing having an outer diameter only slightly smaller than the outer diameter of the thin-walled outer ring of the radial roller bearing.

Figure 1:
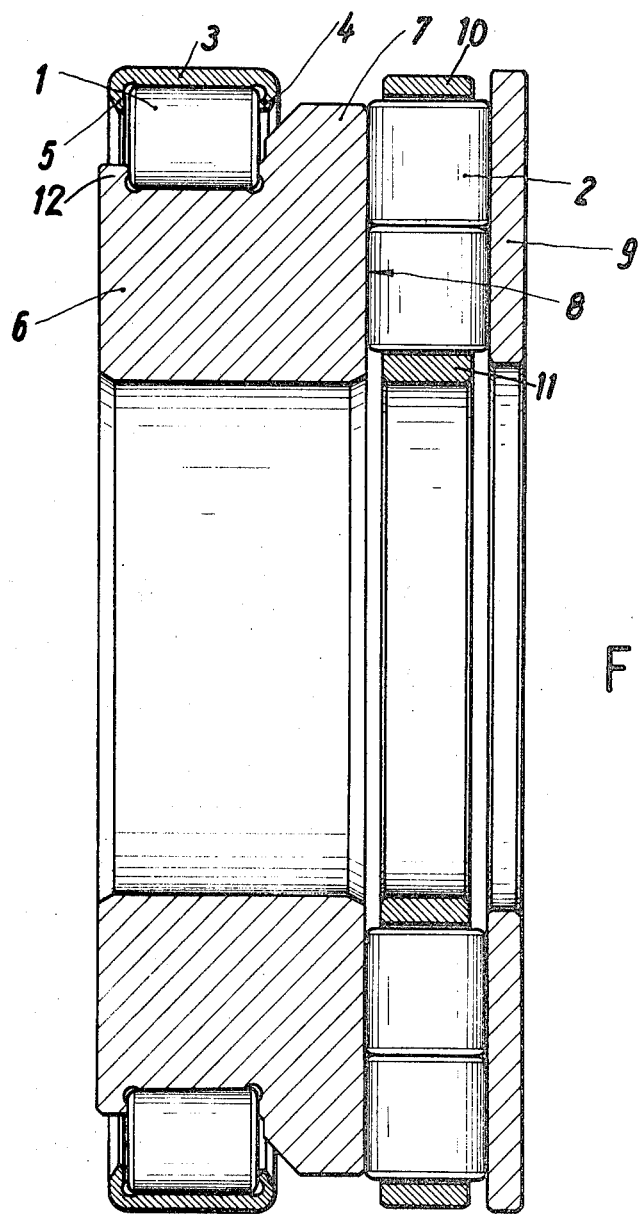
FIG. 1 is a cross-sectional view of the compact roller bearing assembly having internally directed flanges.

In the roller bearing assembly of this invention, the total space in the radial direction is available to the axial roller bearing. With the exception of the slight amount of space required for the end rings of the cage for the axial roller bearing, the total radial height of the roller bearing assembly is usable as a race for the axial roller bearing. The radial roller bearing subassembly as shown in FIG. 1, has the largest possible diameter of a circle laid through the axes of the rollers of the radial roller bearing, which is feasible in the available design space. Thus the greatest possible number of roller bodies can be accommodated in the radial roller bearing. The thin-walled outer ring of the radial roller bearing occupies a very small percentage of the total diameter of the radial roller bearing subassembly.

The load capacity of the thin-walled outer ring of the radial roller bearing is less than the load capacity of the massive inner ring. However, this lesser load capacity does not have a disadvantageous effect on the radial load capacity, because the thin-walled outer ring will be forced into a corresponding bearing housing, for example, the bore of a machine part, which reinforces and supports the thin-walled outer ring. The roller bearing assembly of the invention has been found to be especially suitable for axial piston pumps, as well as for other similar apparatus and devices.

As illustrated in FIG. 1 of the drawing the compact roller bearing assembly for the reception of radial and axial loads comprises a radial roller bearing with radial rollers 1 and an axial roller bearing with axial rollers 2. The radial roller bearing subassembly is of the full component type and comprises a thin-walled drawn outer ring 3 with internally directed flanges 4 and 5, and a massive inner ring 6. On one side of ring 6 is a first flange 7, extending to the radial outer area of the radial roller bearing subassembly. On the other side, the massive inner ring 6 displays a second flange 12 aligned with and spaced from flange 5. The face 8 of the massive inner ring 6 enlarged by flange 7 forms one race for the axial rollers 2, while their opposite race is formed by a plate 9. The rollers 2 of the axial roller bearing are guided by a cage with an inner end ring 11 and an outer ring 10, connected by crossbars, not shown.

An advantageous embodiment of the invention provides that the roller faces of the roller bodies in the radial roller bearing run upon flanges 12 and 7 of the massive inner ring. Furthermore, the thin-walled outer ring 3 of the radial roller bearing has on both of its lateral edges internally directed flanges 4 and 5. Also the inner flange 7 and the outer flange 12 of the massive inner ring 6 serve as guiding flanges for the radial roller bearing bodies.

In the assembly of this embodiment, one flange edge of the thin-walled outer ring of the radial roller bearing is bent inward and the rollers are placed upon said edge. Then the other one of the flanges of the thin-walled drawn outer ring is turned inwardly after inserting the roller bodies. In this embodiment, the greatest possible number of rollers can be accommodated and thus the greatest possible load capacity of the roller bearing assembly can be attained.

Figure 2:
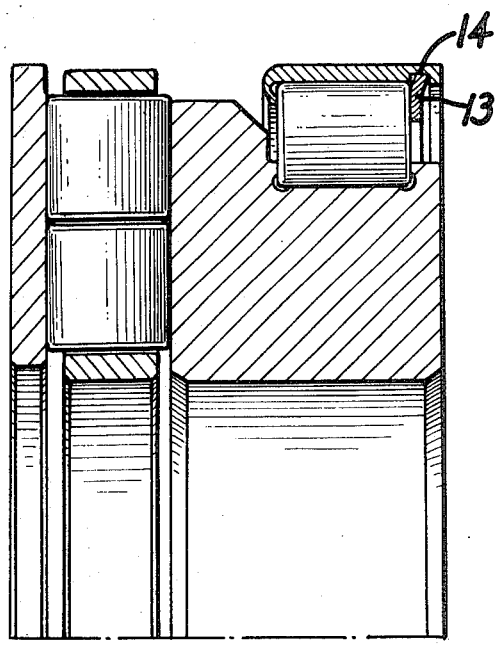
FIG. 2 is a cross-sectional view of half of the compact roller bearing assembly showing the locking ring feature of this invention.

Another embodiment of the invention shown in FIG. 2, provides that at least one flange of the thin-walled drawn outer ring 3 of the radial roller bearing is formed by a locking ring 13. The locking ring, for instance, can be like a snap ring. One flange edge of the thin-walled outer ring of the radial roller bearing is bent inward and the rollers abut against this edge. A shallow groove 14 is made in the opposite edge of the outer ring; and locking ring 13 which may be slightly bent, is snapped into place in groove 14.

Figure 3:
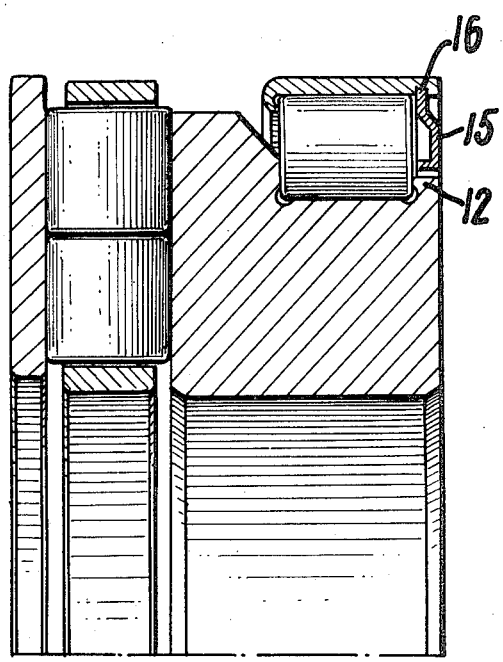
FIG. 3 is a cross-sectional view of half of the compact roller bearing assembly showing the seal ring feature of this invention.

A further embodiment of the invention is shown in FIG. 3 and provides that the radial roller bearing is sealed on one side by bending inwardly one flange end of the thin-walled outer ring. The rollers abut against this edge. A shallow groove 16 is made in the opposite edge of the outer ring; and a locking ring in the form of a split seal ring 15 is inserted into groove 16. Seal ring 15 extends substantially the entire distance from groove 16 to flange 12 and comprises a zig-zag upper portion with a reversed L lower portion.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A compact roller bearing assembly for the reception of radial and axial loads comprising a radial roller bearing in combination with an axial roller bearing; the radial roller bearing comprising a series of radial roller bodies between a thin-walled drawn outer ring and a massive inner race ring; said massive inner ring having on one side thereof a first flange extending radially outwardly to the radially outer area of the radial roller bearing; said first flange of the massive inner ring having a face acting as a raceway for the axial roller bearing; said axial roller bearing having an outer diameter only slightly smaller than the outer diameter of the thin-walled outer ring of the radial roller bearing.

2. The compact roller bearing of claim 1, in which the massive inner ring further comprises a second flange; in which the faces of the radial roller bodies run upon the first flange and the second flange of the massive inner ring; and in which the thin-walled drawn outer ring has internally directed flanges on each of the lateral edges.

3. The compact roller bearing of claim 2 in which the radial roller bearing is of the full component type and at least one of the flanges of the thin-walled drawn outer ring is bent inwardly after the insertion of the rollers.

4. The compact roller bearing of claim 2 in which at least one flange of the thin-walled drawn outer ring of the radial roller bearing is formed by a locking ring.

5. The compact roller bearing of claim 2 in which the radial roller bearing is sealed at least on one side.

6. The compact roller bearing of claim 4 in which the locking ring is shaped as a seal.

* * * * *